(12) United States Patent
Anver et al.

(10) Patent No.: US 7,548,731 B1
(45) Date of Patent: Jun. 16, 2009

(54) METHOD TO REDUCE POWER CONSUMPTION OF STATIC WIRELESS BEACONS AND COST OF INFRASTRUCTURE

(75) Inventors: Ahamed S. Anver, Colombo (LK); Timothy J. Fletcher, Leicestershire (GB); Edward G. Jellard, Southampton (GB); William R. Smart, Limpsfield (GB); Anton Stefanek, London (GB); Gavin P. Willingham, North Baddesley (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/182,664

(22) Filed: Jul. 30, 2008

(51) Int. Cl.
*H04B 1/00* (2006.01)
(52) U.S. Cl. .......................... 455/69; 455/522; 455/70; 455/517; 455/524; 370/318; 370/328; 342/125; 342/126; 342/450
(58) Field of Classification Search ... 455/456.1–456.6, 455/522, 524, 13.4, 41.2, 69–70, 443–444, 455/446, 449, 453; 370/318, 328, 338; 342/126, 342/125, 450–458, 463–465
See application file for complete search history.

(56) References Cited

U.S. PATENT DOCUMENTS

| | | | | |
|---|---|---|---|---|
| 6,560,463 | B1 * | 5/2003 | Santhoff | 455/522 |
| 6,590,537 | B2 | 7/2003 | Bay | |
| 6,819,286 | B2 | 11/2004 | Armbruster et al. | |
| 6,961,594 | B2 | 11/2005 | Rankin | |
| 7,082,107 | B1 | 7/2006 | Arvelo | |

(Continued)

FOREIGN PATENT DOCUMENTS

WO   WO 01/58098   8/2001

OTHER PUBLICATIONS

"Experiments on Local Positioning With Bluetooth", Kotaneu, A. et al.; Proceedings of the International Conference on Information Technology: Computers and Communications (ITCC '03), 2003.

(Continued)

*Primary Examiner*—Edward F. Urban
*Assistant Examiner*—Fayyaz Alam
(74) *Attorney, Agent, or Firm*—Oppenheimer Wolff & Donnelly LLP

(57) ABSTRACT

The present invention provides for reducing power consumption of a positioning system having wireless beacons. A wireless transmitter static beacon is provided, which has a known position, signal strength, and range. A mobile device is positioned within the range of the static beacon and its position is determined based on a signal from the static beacon. Foreign wireless transmitter devices and their locations are detected. The immobility of the foreign devices is evaluated by periodically determining their positions and calculating the frequency with which their positions change, and by determining the devices' types. A subset of the foreign devices that are immobile are selected and amalgamated into the positioning system based on device type and position-changing frequency. The signal strength of the static beacon is reduced, which in turn reduces the range of the static beacon. The mobile device is no longer positioned in the static beacon's range, but it is positioned within the range of the new subset of foreign devices. The mobile device's position is determined with increased accuracy based on a signal from the subset of new foreign devices.

1 Claim, 4 Drawing Sheets

U.S. PATENT DOCUMENTS

| | | | |
|---|---|---|---|
| 7,162,250 B2 * | 1/2007 | Misra | 455/453 |
| 2007/0030972 A1 | 2/2007 | Glick et al. | |
| 2008/0248801 A1 * | 10/2008 | Fletcher et al. | 455/435.2 |

OTHER PUBLICATIONS

"Partial Delaunay triangulation and degree limited localized Bluetooth scatternet formation", Li, X.-Y.; Stojmenovic, I.; Wang, Y.; Parallel and Distributed Systems, IEEE Transactions; vol. 15, Issue 4, Apr. 2004 pp. 350-361.

"Accuracy and timing aspects of location information based on signal-strength measurements in Bluetooth", Figueiras, J.; Schwefel, H.-P.; Kovacs, I.; Personal, Indoor and Mobile Radio Communications, 2005. PIMRC 2005. IEEE 16th International Symposium; vol. 4, Sep. 11-14, 2005 pp. 2685-2690.

"Local positioning for wireless sensors based on Bluetooth", Castaño, J.G.; Svensson, M.; Ekström, M.; Radio and Wireless Conference, 2004 IEEE, Sep. 19-22, 2004 pp. 195-198.

"RF Rendez-Blue: reducing power and inquiry costs in Bluetooth-enabled mobile systems", Hall, E.S.; Vawdrey, D.K.; Knutson, C.D.; Computer Communications and Networks, 2002. Proceedings. Eleventh International Conference; vol. , Issue , Oct. 14-16, 2002 pp. 640-645.

Balancing the accuracy and practicality of location tracking in heterogeneous mobile networks:, Alicherry, M., Nagesh, H., Phadke, C., Poosala, V., Philip, S.J.; Lucent Technol. Bell Labs., Murray Hill, NJ; Global Telecommunications Conference, 2004. Globecom '04. IEEE; Nov. 29-Dec. 3, 2004, vol. 5, pp. 3316-3320 vol. 5.

* cited by examiner

METHOD TO REDUCE POWER CONSUMPTION OF STATIC WIRELESS BEACONS AND COST OF INFRASTRUCTURE

FIELD OF THE INVENTION

The invention generally relates to reducing power consumption of wireless beacon positioning systems.

BACKGROUND OF THE INVENTION

Wireless-based positioning systems rely on having a number of wireless transmitters. Such "static beacons" have known properties, including position and signal strength. These static beacons act as reference points from which positions of non-static devices can be calculated. It is possible to reduce the power output of the static beacons, which results in lower signal strength and a reduced range of visibility to non-static devices. Maintaining a lowered signal strength reduces the power usage of the static beacons, which in turn reduces the running cost of the system as a whole and achieves the usual environmental benefits of reducing power consumption.

As the density of static beacons increases within a given area, the accuracy of calculation increases. With reference to FIG. 1A, the signal of a static beacon SB1 covers an area SB1A. Area SB1A defines the area in which a non-static device, such as mobile device MD1, may reside and receive wireless signals from a static beacon. Such signals may be used to calculate position information for the mobile device MD1. Adding a second static beacon SB2 that covers area SB2A, shown in FIG. 1B, increases the accuracy for determining the current location of mobile device MD1 because MD1 is in the range covered by both SB1 and SB2. Adding SB2 also increases the total range for MD1. Therefore certain benefits exist for providing a greater number of static beacons within the system.

Due to power and hardware requirements in current implementations, however, rising density equates to rising cost. Furthermore, as density increases the marginal utility of each additional beacon decreases. Referring to FIG. 1C, adding another static beacon SB3 may provide additional accuracy for MD1. However, the additional area of coverage for MD1 achieved by adding SB2 to SB1 is significantly larger than that gained by adding SB3, and thus the benefits of adding SB3 are mitigated by the diminishing returns for the additional area of coverage of SB3. This is particularly true for a presence-based algorithm.

Accordingly, there is a need in the art for a system and method that provides power consumption reduction for wireless beacons without substantially impacting the accuracy calculation.

BRIEF SUMMARY OF THE INVENTION

The present invention provides for reducing power consumption of a positioning system having wireless beacons. A wireless transmitter static beacon is provided, which has a known position, signal strength, and range. A mobile device is positioned within the range of the static beacon and its position is determined based on a signal from the static beacon. Foreign wireless transmitter devices and their locations are detected. The immobility of the foreign devices is evaluated by periodically determining their positions and calculating the frequency with which their positions change, and by determining the devices' types. A subset of the foreign devices that are immobile are selected and amalgamated into the positioning system based on device type and position-changing frequency. The signal strength of the static beacon is reduced, which in turn reduces the range of the static beacon. The mobile device is no longer positioned in the static beacon's range, but it is positioned within the range of a new foreign device. The mobile device's position is determined with increased accuracy based on a signal from the new foreign device.

DETAILED DESCRIPTION OF THE INVENTION

The present invention will be described in detail with reference to the figures below. The invention generally relates to a system and method for reducing power consumption of static wireless beacons and cost infrastructure. Wireless-based positioning systems in accordance with the present invention may include multiple static beacons, and the static beacons are in communication with a central computer through wireless radio and power-line signaling (e.g., ×10), and the like, or the beacons can be fully networked devices.

Figures 1A, 1B, 1C:
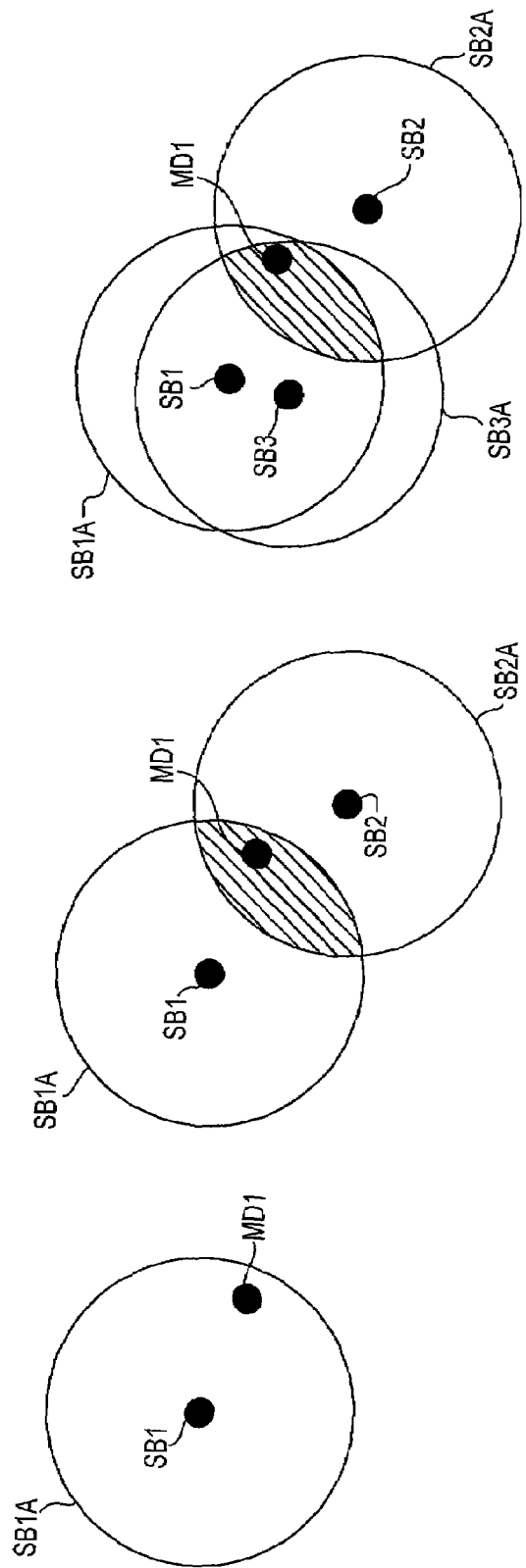
FIGS. 1A-1C contain block diagrams illustrating static wireless beacon positioning systems existing in the prior art.
Figure 2B:
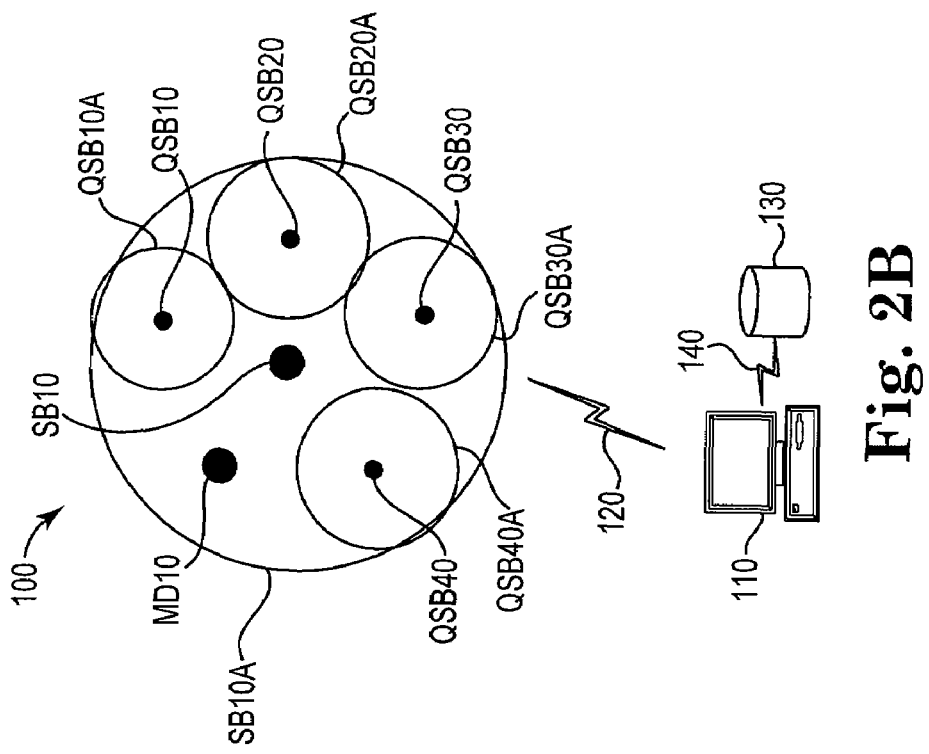
FIGS. 2A-2D contain block diagrams illustrating wireless beacon positioning systems in accordance with one embodiment of the present invention.
Figure 2A:
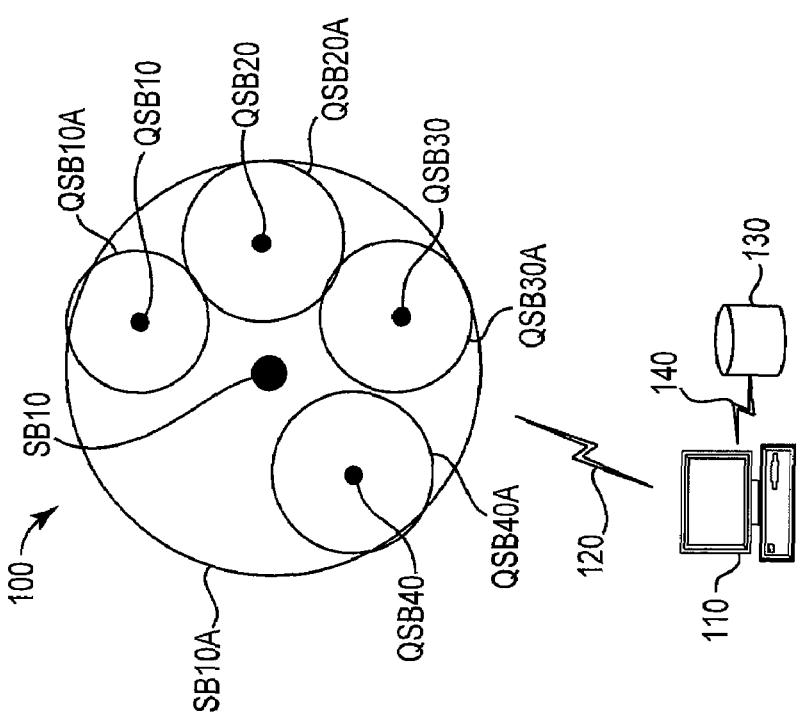

Referring to FIG. 2A, a positioning system 100 is shown, including static beacon SB10 having a known position and a signal that covers an area SB10A. The signal strength of static beacon SB10 is controllable and may be modified upward or downward as desired, which in turn increases or decreases respectively the area in which the positions of non-static devices can be calculated from the static beacon's signal.

In addition to static beacon SB10, other devices may be employed as beacons to supplement static beacon SB10 as described below. Such devices are referred to broadly hereinafter as quasi-static beacons. The quasi-static beacons will generally be wireless transmitters and will have a knowable location. These devices may be generally static, but it is anticipated that they may change location from time to time. A variety of such quasi-static beacon devices may be available such as, without limitation, printers, copiers, cameras, desktop computers, laptop computers, PDAs, etc.

One or more quasi-static beacons may be present within area SB10A. For example, referring again to FIG. 2A, quasi-status beacons QSB10, QSB20, QSB30, and QSB40 may exist within area SB10A, may transmit wireless signals over a range defined by areas QSB10A, QSB20A, QSB30A, and QSB40A respectively.

By using existing devices as quasi-static beacons to perform the function of static beacons, the number of dedicated static beacons required can be reduced, which in turn can reduce the cost of infrastructure. In addition, by using the knowledge of the "new" beacons, the power output of the existing beacons can be reduced, thus reducing cost further.

Identify Quasi-Static Devices

The positioning system 100 of the present invention includes static beacon SB10 with a known position, and the position is stored in a central computer 110. The positioning system 100 also detects other devices that may be suitable to employ as quasi-static beacons. For example, the system may identify potential quasi-status beacons QSB10, QSB20, QSB30, and QSB40, shown in FIG. 2A. The position of each of these devices is also stored in the central computer. The devices need not be formally part of the preexisting static beacon system. Any identified, suitable device that is detected may be incorporated into the system as shown in FIG. 2A. The detected devices may become candidates for being employed as quasi-static beacons in the system as described herein.

The system further discerns how immobile each identified device is over time and how stationary each device may be expected to remain. For example, if an identified device appears to be stationary for longer than a predetermined period of time, it may be considered to be sufficiently static to be employed in the system and used in the same way that the system uses static beacons. This is achieved by monitoring the positions of the devices over time. The system may calculate a mobility metric for each device, where a high mobility metric indicates that a device frequently changes location and a low mobility metric indicates that the device is generally stationary. Accordingly, those devices with lower mobility metrics are generally good candidates for being employed as quasi-static beacons in the system.

For example, the system may assess the mobility of each identified device by first recording the positions of devices within the system over time. The position-time data for each identified device is received and processed by the central computer 110 and may be stored in a time-sensitive database 130 or other suitable component, which is in communication with central computer via connection 140. The central computer 110 is communication with all of the beacons via connection 120, which may be any suitable electronic communication means, wireless or a combination of wired and wireless connections. Next, the system periodically queries this knowledge, and the central computer performs an analysis to determine if any of the devices are stationary. This step may be accomplished using an appropriate algorithm on the computer to determine which devices are stationary.

The algorithm may be a function of various pieces of information for performing its analysis, including a location of the quasi-static beacon device for a plurality of points of time. The algorithm may also be used to select a quasi-static beacon based on the device type. For example, in one aspect the system may assess the candidacy of quasi-static beacon candidate devices based on their type using Bluetooth device-type discovery. Bluetooth device-type discovery receives a Bluetooth signal from a device and processes the signal information to determine the device type, such as a printer, camera, desktop computer, laptop, PDA, etc.). Those skilled in the art will appreciate that other techniques and technologies may be readily employed to ascertain the type of device from which a wireless signal is detected and received.

Then, a combination of the device type information and location information may then assist in assessing the candidacy of quasi-static beacon candidate devices. For example, it is known that printers are generally less likely to be moved often, and therefore after a few days of being stationary, a printer device may be promoted as a strong candidate for being employed as a quasi-static beacon in the system. Similarly, desktop computers and headphones may also be considered good candidates for being employed as quasi-static beacons in the system after it has been determined that they did not move for a few weeks. Mobile phones and PDAs are unlikely to stay in the same location for long, and therefore they would rarely be considered. However, if such a device were static for a longer period of time, such as 30-60 days, it may be considered a viable candidate for being employed as a quasi-static beacon. Although examples of varying time durations for immobility for different device types are described above, those skilled in the art will appreciate that other suitable durations may be implemented and modified as desired.

Finally, the system feeds the resulting mobility and device-type information back into the original position calculation to improve it. The foregoing occurs without adversely affecting the core ability of the system to continuously calculate position data of mobile devices as described above. Moreover, the processes of detecting and assessing devices as candidates for being employed as quasi-static beacons may be ongoing, as new devices identified and existing devices may become unavailable and new ones are required.

Upon identifying good candidate devices for quasi-static beacons, and determining a need for beacons in the vicinity of those candidate devices, the system employs those devices as quasi-static beacons. Referring to FIG. 2B, quasi-static beacons QSB10, QSB20, QSB30, and QSB40 may be employed into the positioning system 100. The wireless signals received by a mobile device, such as MD10, may be used to calculate position information for the mobile device MD10 either directly, where the signals from the quasi-static beacons contain position data, or indirectly, where the signals may contain a beacon identifier or other information (e.g., Bluetooth ID) that may then be used to perform a position calculation based on periodically-updated and stored data relating to the quasi-static beacons' positions.

Control Power Usage of Static Beacons

As described, the signal strength of static beacon SB10 is controllable and may be modified upward or downward as desired, which in turn increases or decreases respectively the area in which the positions of non-static devices can be calculated from the static beacon's signal. The ability to control the power usage of static beacons within the system facilitates a variety of goals, including operating cost reduction.

The location of the quasi-static beacons is generally not controlled by the system. Accordingly, although several quasi-static devices may be in use in the system, a mobile device, such as a mobile phone, may not be with range of one of the quasi-static devices. Referring again to FIG. 2B, mobile device MD10 is located with the area SB10A of static beacon SB10, but MD10 is not within the range QSB10A, QSB20A, QSB30A, and QSB40A of any of the identified quasi-static devices, QSB10, QSB20, QSB30, and QSB40. In this scenario, the signal strength of static beacon SB10 is maintained because it is the only beacon within the range of mobile device MD10.

Figure 2D:
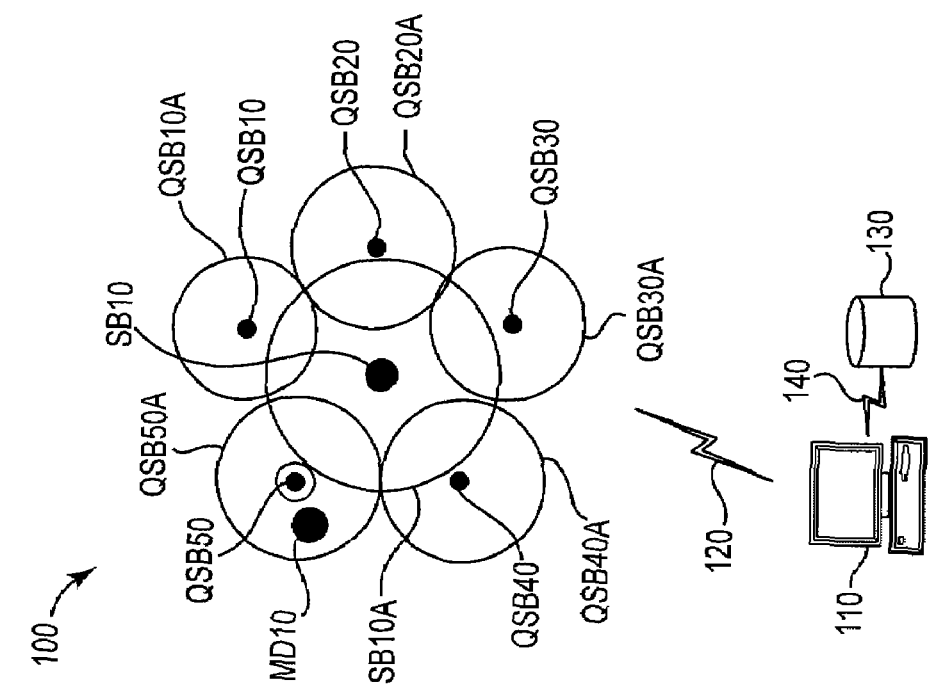
Figure 2C:
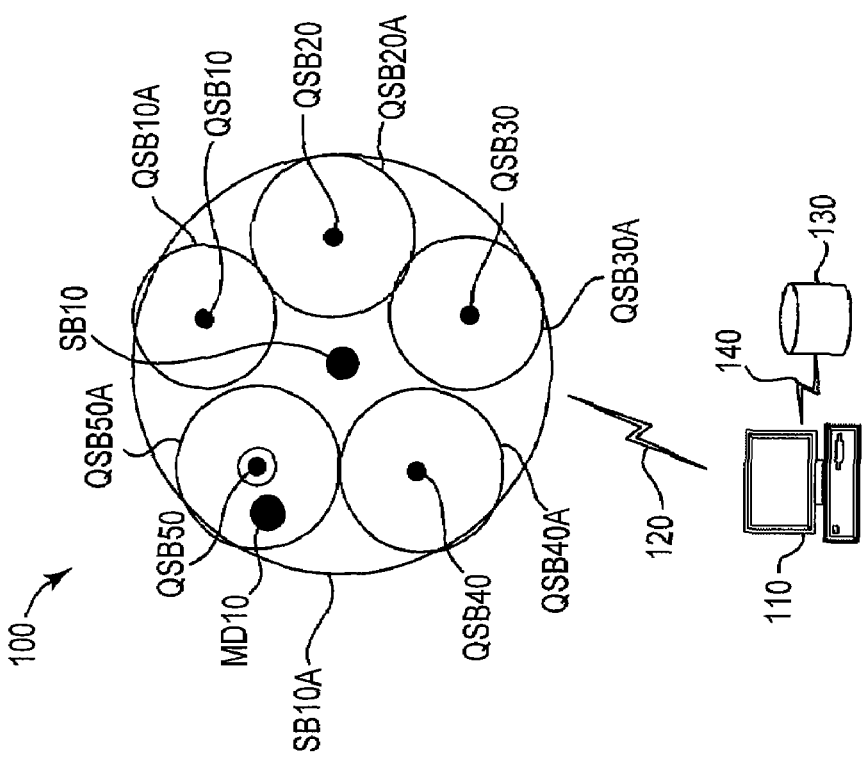

However, upon detecting and employing another quasi-static beacon at a desirable location, quasi-static beacon QSB50, mobile device MD10's location now falls within the range QSB50A of this newly added beacon, as shown in FIG. 2C. Static beacon SB10's range area SB10A encompasses the entirety of new quasi-static beacon QSB50's area QSB50A. Static beacon SB10 now adds nothing to the system for purposes of calculating the position of mobile device MD10.

The power of static beacon SB10 is reduced, thereby reducing its signal strength and range, as shown in FIG. 2D. The result is that area SB10A of static beacon SB10's range is shrunk, yielding a several overlapping regions that provide better position accuracy. Notably, although mobile device MD10 is no longer within the range of static beacon SB10, the mobile device is within the range of quasi-static beacon QSB50 and the device can calculate its position from QSB50. The central computer continuously monitors the position and signal strength of each quasi-static beacon. If quasi-static beacon QSB50 were removed or powered down thereby leaving mobile device MD10 outside the range of any beacon, the system would respond by increasing the power of static beacon SB10, and mobile device MD10's position would be covered again, as shown in FIG. 2B.

Operation

Figure 3:
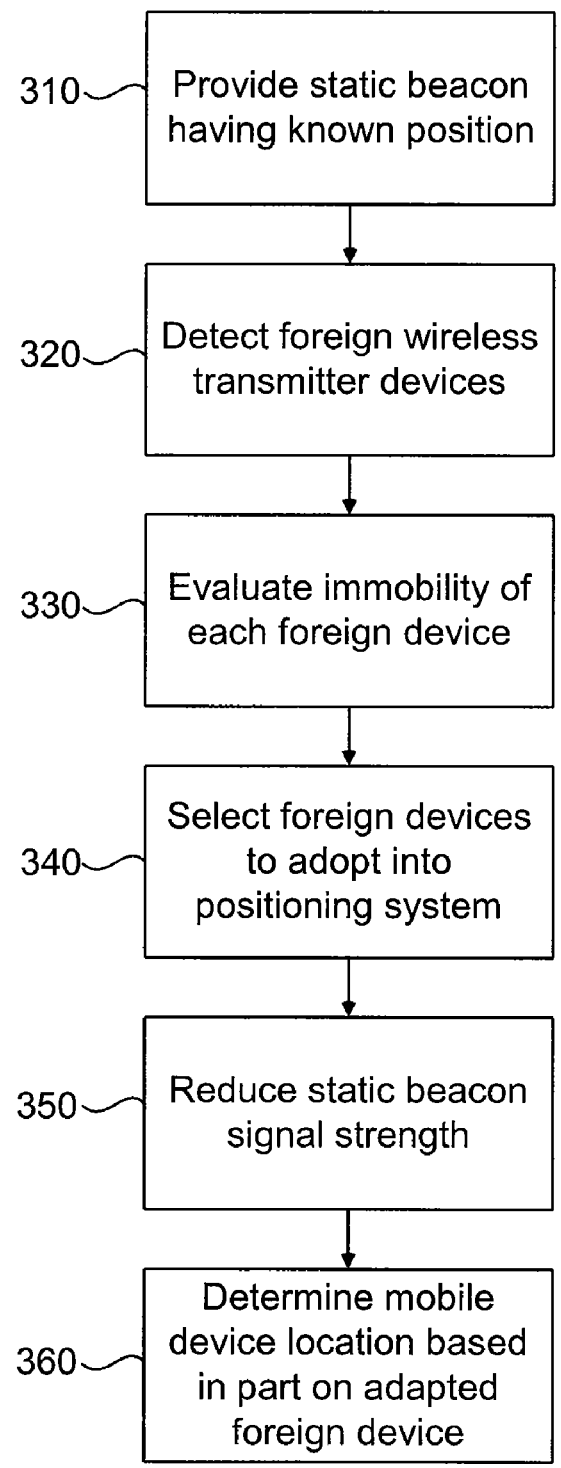
FIG. 3 contains a flowchart of a method for reducing power consumption of a positioning system having wireless beacons in accordance with one embodiment of the present invention.

Referring now to FIG. 3, in operation a wireless transmitter static beacon is provided, which has a known position, signal strength, and range, at step 310. A mobile device is positioned within the range of the static beacon and its position is determined based on a signal from the static beacon. At step 320, foreign wireless transmitter devices and their locations are detected. At step 330, the immobility of the foreign devices is evaluated by periodically determining their positions and calculating the frequency with which their positions change, and by determining the devices' types. A subset of the foreign devices that are immobile are selected and amalgamated into the positioning system based on device type and position-changing frequency, at step 340. At step 350, the signal strength of the static beacon is reduced, which in turn reduces the range of the static beacon. The mobile device is no longer positioned in the static beacon's range, but it is positioned within the range of the new subset of the foreign devices. At step 360, the mobile device's position is determined with increased accuracy based on a signal from the new subset of the foreign devices.

Those skilled in the art will appreciate the foregoing may be applied to a variety of systems that include multiple static beacons, which are centrally controlled. By identifying and adding more quasi-static beacons to serve as reference points in the system as described above, the strength of static beacons can be reduced without substantially impacting accuracy of the system. The system can also detect times of the day when there were no devices in the system (e.g. in the middle of the night) and again, adjust the power of the static beacons accordingly. In order to accomplish this, the central computer of the system (1) calculates the minimum signal strength that each static beacon in the system can run at without reducing the overall accuracy of the system, and (2) communicate with the static beacons to determine out their current signal strength and to control them accordingly. This process runs concurrently to other functions performed by the system, such as communicating with mobile devices.

The system and method is readily applicable to variety of node-based positioning systems. Thus another formulation of the method of the present invention provides for determining if a foreign node is static, and, if so, reducing the power output of neighbor nodes thereby increasing of the positioning functions of the system, which is achieved by the node overlap, as shown in FIG. 2D. When foreign nodes are determined to be static, they are amalgamated into the triangulation positioning system as static nodes. The ability to reduce maintenance cost of a triangulation positioning network by adopting foreign hosts and reducing node output power is thereby achieved.

Although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. A method for reducing power consumption of a positioning system having wireless beacons, comprising:

providing a static beacon, said static beacon being a wireless transmitter having a known position, signal strength, and range, wherein a mobile device is positioned within the range of the static beacon and a position of the mobile device is determined based on a signal therefrom;

detecting and identifying a plurality of foreign wireless transmitter devices, including obtaining a location for each of the plurality of foreign devices;

evaluating the immobility of each of the plurality of foreign devices, including:

periodically determining a position of each of the plurality of foreign devices and calculating a duration for which each foreign device remains stationary based thereon determining a device type for each of the plurality of devices;

selecting and amalgamating into the positioning system a subset of the plurality of foreign devices that are immobile, said subset selected based on the device type and the duration for which each foreign device remains stationary; and reducing the signal strength of said static beacon thereby reducing the range of the static beacon such that the mobile device is no longer positioned therein, wherein the mobile device is positioned within a range of said subset of the plurality of foreign devices that are immobile.

* * * * *